Feb. 7, 1956  A. C. SIMON  2,734,094

METHOD FOR WELDING LEAD TO LEAD

Filed March 16, 1953

INVENTOR
ALBERT C. SIMON

BY

ATTORNEYS

2,734,094
METHOD FOR WELDING LEAD TO LEAD

Albert C. Simon, Arlington, Va., assignor to the United States of America as represented by the Secretary of the Navy Application March 16, 1953, Serial No. 342,767

6 Claims. (Cl. 136—67)

(Granted under Title 35, U. S. Code (1952), sec. 266)

This invention relates to a method for welding lead surfaces to one another, more especially for the production of porous lead articles, and to new highly porous lead battery plates for acid lead type electric storage batteries.

It is known that the capacity of clean metal surfaces to cohere to each other is due to the natural surface adhesive force of the metal. For example, freshly cut surfaces of lead will adhere to each other by merely bringing them together into contact. This cohesive force of the lead is reduced to a practical nullity, however, by exposure of the metal to air for any substantial period of time, for example, for an hour or even less. Practically speaking, therefore, lead under normal conditions of use and handling is not self-welding since by its existence in the atmosphere it acquires a film of oxide and possibly also of sulfide which acts as a barrier to cohesion between contacting lead surfaces. To overcome this barrier film and to form porous articles from lead, the prior art has customarily subjected lead powder to a hot or cold pressing in a mold to form a compact of the lead particles which are thereafter worked to the shape of the desired article. The effect of the pressure on the lead particles is to set up a condition of attrition in the mass which removes the barrier film from the particles and permits metallic contact and atomic welding of the particles to take place. This prior art procedure is not conducive to the production of highly porous articles of lead, for example, lead battery plates for acid lead type electric storage batteries, since the pressure applied in forming the lead particle compact will reduce the porosity and increase the density of the completed article, aside from that which may take place on any subsequent working of the lead particle compact to the desired shape.

It is a principal object of the present invention to provide a method for the welding of lead surfaces to one another which is simple and direct and does not require the application of extraneous pressure to effect atomic welding between the lead surfaces, although the same may be applied if desired. It is also a principal object to produce highly porous welded articles from lead particles, more especially lead battery plates for acid lead type electric storage batteries. Other objects of the invention will become apparent from the description which follows.

I have found that lead surfaces can be welded to one another by bringing them together in the presence at the site of contact of a flux in the form of a solution of hydrogen peroxide in aqueous acetic acid, which solution is hereinafter more fully identified. The flux serves to remove the film barrier from the surface of the lead allowing the natural cohesive force of the metal to exert itself and form a contact or atomic weld between the lead surfaces which takes place instantly at all the lead surfaces in contact. Pressure is required only where it is necessary or desirable to bring uneven surfaces into contact. The application of heat is not necessary, the method being effective in the cold to weld lead surfaces together. The method has the further advantage that the flux is water-soluble and can be washed from the finished article without difficulty, so that it interferes in no way with the subsequent use of the bonded lead article.

The method of my invention is applicable to the welding together of lead surfaces irrespective of their geometrical pattern or surface configuration. Thus, it may be applied to the lamination of lead sheets as well as to the production of porous articles from lead particles, such as lead shot, powder and wool. Articles of various shapes and kinds may be made with the use of the new method which finds particular application for the production of highly porous articles of large surface area having a structure formed of lead particles, such as size graded lead shot, bound in open network by contact or atomic welding between the lead particles. Exemplary of this type of article are self-lubricating bearings and battery plates for acid lead type electric storage batteries.

Lead battery plates which can be made by the method of my invention are illustrated in the accompanying drawing in which.

Figure 1:
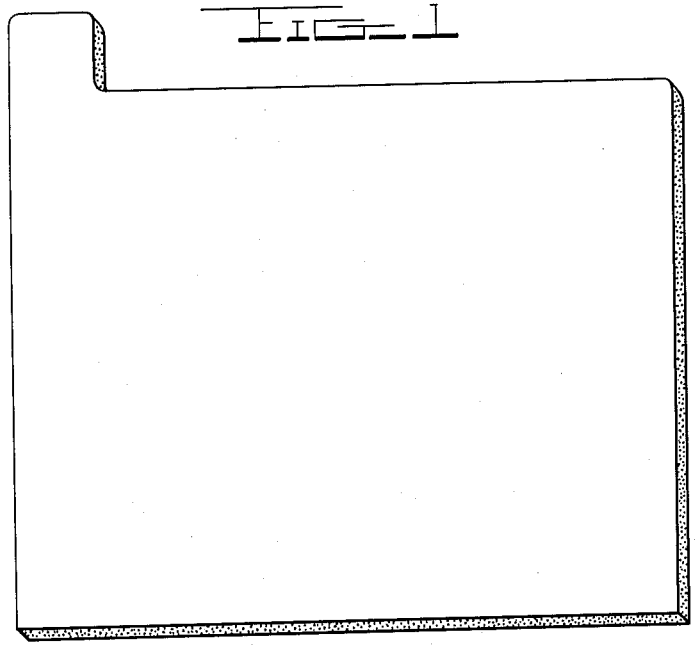
Figure 1 is a view in elevation and partly in perspective of a new lead battery plate in accordance with the invention.

The use of heat is not necessary to effect welding of the lead surfaces to each other. Since welding will take place at room temperature, the method of the invention can be used for lead caulking of soil pipe and for the forming of molds where the use of heat would be inadvisable.

The aqueous solution employed as flux for the lead in the new welding method should contain between about 2 and 5.5% hydrogen peroxide by weight and between about 40 and 85% acetic acid by weight. Concentrations of hydrogen peroxide above about 5.5% by weight were found to give a violent reaction accompanied by vigorous gassing and evolution of heat and welding of the lead was not good even when pressure was applied. Solutions of acetic acid and water alone do not produce welding of the lead at any concentration of the acid. The presence of hydrogen peroxide is necessary to effect welding. A preferred range of concentrations of acetic acid in the aqueous solution of hydrogen peroxide is between about 45 and 60% acetic acid by weight. The flux solution may be made up by adding strong acetic acid of known concentration, for example, glacial acetic acid (99.5%) and aqueous hydrogen peroxide of known concentration, for example, Superoxal (hydrogen peroxide 30%) in the proper proportions to the calculated amount of water and stirring the mixture to effect solution of the ingredients.

In the practice of the method of the invention, the flux may be applied to the lead surfaces to be welded in any manner found suitable, it being necessary only that the flux be present at the site of the contact between the lead surfaces. The aqueous acetic acid-hydrogen peroxide solution may be applied to the surfaces of the lead to be welded either before or after they have been brought into contact. Lead pieces of relatively large surface area, for example, sheets of lead, may be painted or wiped with the aqueous acetic acid-hydrogen peroxide solution before being brought into contact. Where particles of lead are to be welded, such is done in molds and the flux solution is flowed into the mold in such manner as not to unduly disturb the setting of the lead particles therein. The flux can be removed from the mold and formed article by flushing with water.

The molds employed for forming welded articles from lead particles, such as shot, powder or wool, should preferably be sectionalized so that the walls may be removed for filling of the mold with the lead particles and to facilitate removal of the formed article from the mold.

They should also be resistant to attack by the acid flux and for this purpose molds made of aluminum or stainless steel are suitable as are those made of phenol-formaldehyde (Bakelite) resin containing fabric laminae. A preferred mode of applying the flux solution to the filled molds is to set up the mold in a container with the top face of the mold open or closed with a loosely fitting cover and pour the flux solution into the container to one side of the mold until the level of the solution is above that of the mold and flow of the flux into the mold and over the lead particles is effected. In the case of the top covered mold, the flux solution will flow into the mold by reason of the space between the cover and the mold walls.

The formed lead article may be pressed to increase its tensile strength, although thereby some reduction in porosity is incurred. The magnitude of the pressure applied can be gauged to effect the necessary increase in tensile strength of the article while at the same time incurring a minimum of reduction in porosity therein. Light pressures of about 25 to 50 pounds per square inch will generally be found adequate to substantially increase the tensile strength of the lead article without at the same time bringing about a substantial reduction in its porosity. Of course, pressing may be applied for reduction in porosity of the lead article where desired. The pressing is carried out while the article is still wet with the flux solution and can be done either in the mold or after the article has been removed therefrom and in any way found suitable. In the case of molds of rectangular type with sectionalized walls, the mold containing the still wet lead article is placed in a container of acid resistant metal adapted to hold the mold in position for the pressing operation. The upper wall of the mold is removed and a hard smooth-faced block of acid resistant material, for example of wood, of the proper dimensions to cover the exposed face of the lead article is placed down thereon in the open face of the mold. Pressure is applied to the block, for example, by a rolling motion or the whole assembly of container, mold and block can be pressed between the jaws of a simple plate press.

The invention is further illustrated by the following specific examples for the preparation of lead battery plates of the invention following the method of the invention.

*Example 1*

Lead shot graded to 20 mesh size is filled in to the upper open face of a horizontally disposed plastic mold made of Bakelite resin containing fabric laminae and shaped to the configuration of the usual lead plate of the acid lead type electric storage battery. The shot is filled level with the mold walls and is not pressed therein. The filled mold is placed in an acid resistant metal container and a solution of 4% hydrogen peroxide by weight in aqueous acetic acid containing 85% acetic acid by weight is poured into the container to one side of the mold until the level of the solution is above that of the mold and the solution flows into and through the lead shot in the mold. Welding of the lead shot together takes place spontaneously in a matter of seconds and without the application of pressure. The formed battery plate is firm and can be handled without disintegration but preferably is subjected to a light compression in order to increase its tensile strength, for example, to a compression of about 25 to 50 p. s. i. The pressing operation can be carried out by the procedure described above by placing the mold containing the formed lead plate still wet with the flux solution in a second metal container, placing a wood block in the open top of the mold and with a smooth surface thereof faced down over the entire area of the broad face of the lead plate, placing the entire assembly in a simple type plate press and subjecting it to the desired compression.

By removing a pair of the end walls of the mold, the formed battery plate may be easily ejected from the mold. The flux solution is washed from the mold and the formed battery plate by flushing with water.

Figure 1 illustrates the type of lead battery plate which can be obtained by following the procedure of the above example including the step of supplying a light pressure transversely of the broad face of the plate while it is still wet with the flux solution for the purpose of increasing the tensile strength of the plate.

*Example 2*

A composite battery plate is made by filling with atomically welded lead shot the openings of a lead battery grid of the type usually employed for making battery plates by the known pasting procedure. These lead battery grids usually contain a proportion of antimony for increased strength, generally from about 4 to 9%. The lead grid is placed in an upper open face horizontally disposed mold of the kind described in Example 1 and the grid openings filled level with 20 mesh graded lead shot, without tamping. The mold containing the lead shot filled grid is placed in a container and treated with flux solution of the composition defined in Example 1 and in the manner therein described. The formed battery plate is not subjected to compressing. Each of the grid openings in the formed battery plate is filled with an open network of atomically bonded lead shot which at its perimeter is atomically bonded to the sidewalls of the grid opening. The flux solution is removed from the mold and battery plate by flushing with water. The plate can be removed from the mold by lifting out a pair of end walls of the mold.

Figure 2:
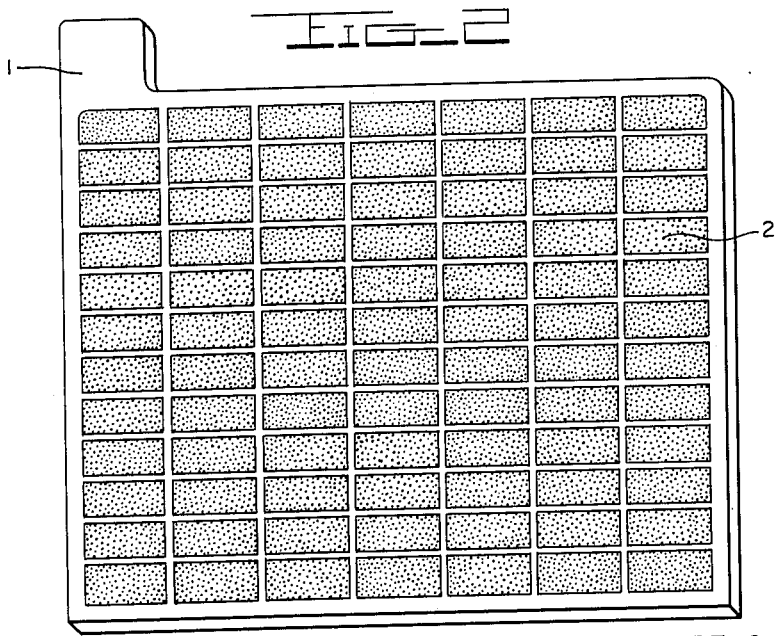
Figure 2 is a like view of a modified form of battery plate in accordance with the invention.

Figure 2 illustrates the type of lead battery plate which can be obtained by following the procedure of Example 2. The lead grid is indicated at 1 and the open network of atomically bound lead shot which fills the grid openings is shown at 2.

Lead battery plates made in accordance with the method of the present invention have a high degree of porosity and large surface area which gives them a high discharge ratio and high capacity as negative plates for acid lead electric storage batteries.

The new method is simple and direct in its application to the welding of lead surfaces and can be used as an alternative method for all processes of powder metallurgy where lead is used and sintering practiced.

While I have described certain specific embodiments in illustration of the method and article of my invention, it is to be understod that the invention is not to be limited thereto but only as is required by the prior art and the appended claims.

The invention described herein may be manufactured and used by or for the Government of the United States of America for governmental purposes without the payment of any royalties thereon or therefore.

What is claimed is:

1. A method of welding lead surfaces to one another which comprises making contact between the lead surfaces at the site of contact of a solution of between about 2 and 5.5% hydrogen peroxide by weight in aqueous acetic acid containing between about 40 and 85% acetic acid by weight.

2. A method of welding lead surfaces as defined in claim 1, wherein the acetic acid content of the aqueous acetic acid solution is between about 45 and 60% by weight.

3. A method of welding lead surfaces as defined in claim 2, wherein the content of hydrogen peroxide in the acetic acid solution is between about 2 and 4% by weight.

4. A method of welding lead particles together which comprises flowing over a mass of the lead particles in a mold a solution of between about 2 and 5.5% hydrogen peroxide by weight in aqueous acetic acid containing between about 40 and 85% acetic acid by weight.

5. A method of welding lead as defined in claim 4, wherein the acetic acid content of the aqueous acetic acid solution is between about 45 and 60% by weight.

6. A method of producing a highly porous lead battery plate of large surface area which comprises flowing over lead particles filled into a mold for forming the battery plate a solution of between about 2 and 5.5% hydrogen peroxide by weight in aqueous acetic acid containing between about 40 and 85% acetic acid by weight and subjecting the formed battery plate while still in the mold and wet with the solution to a light compression of a magnitude sufficient to increase the tensile strength of the battery plate but insufficient to substantially reduce the porosity thereof.

References Cited in the file of this patent

UNITED STATES PATENTS

| | | |
|---|---|---|
| 413,438 | Eggers | Oct. 22, 1889 |
| 738,314 | Fritchle | Sept. 8, 1903 |
| 1,284,426 | Morrison | Nov. 12, 1918 |
| 2,154,455 | Repter | Apr. 18, 1939 |
| 2,277,973 | Hauel | Mar. 31, 1942 |

OTHER REFERENCES

"Pressure Welding," The Welding Journal, August 1951, pages 731–2, Cl. 78–92.